United States Patent
Alili et al.

(10) Patent No.: US 10,919,510 B2
(45) Date of Patent: Feb. 16, 2021

(54) INTEGRATED HYDRAULIC MODULE OF AN ELECTROHYDRAULIC SERVO BRAKE

(71) Applicant: Robert Bosch GmbH, Stuttgart (DE)

(72) Inventors: Amine Alili, Domont (FR); Mickenson Jean Louis, Aubervilliers (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/652,530

(22) PCT Filed: Sep. 12, 2018

(86) PCT No.: PCT/EP2018/074680
§ 371 (c)(1),
(2) Date: Mar. 31, 2020

(87) PCT Pub. No.: WO2019/076548
PCT Pub. Date: Apr. 25, 2019

(65) Prior Publication Data
US 2020/0240443 A1   Jul. 30, 2020

(30) Foreign Application Priority Data
Oct. 18, 2017   (FR) ..................... 17 59769

(51) Int. Cl.
*B60T 13/74* (2006.01)
*F15B 15/14* (2006.01)
*F15B 7/08* (2006.01)

(52) U.S. Cl.
CPC .............. *B60T 13/745* (2013.01); *F15B 7/08* (2013.01); *F15B 15/1414* (2013.01);
(Continued)

(58) Field of Classification Search
CPC .................................. B60T 13/745; F15B 7/08
See application file for complete search history.

(56) References Cited

U.S. PATENT DOCUMENTS 9,982,662 B2 *   5/2018   Weh ...................... B60T 13/745
10,378,623 B2 *   8/2019   Weh .................... F16H 25/2204
(Continued)

FOREIGN PATENT DOCUMENTS

DE   102008038320 A1   5/2009
DE   102009055721 A1   6/2011
(Continued)

OTHER PUBLICATIONS

International Search Report dated Dec. 7, 2018 of the corresponding International Application PCT/EP2018/074680 filed Sep. 12, 2018.

*Primary Examiner* — Michael Leslie
(74) *Attorney, Agent, or Firm* — Norton Rose Fulbright US LLP; Gerard Messina

(57) ABSTRACT

A hydraulic module including a cylinder (2) which accommodates a piston (3) which delimits a chamber (4) which receives the brake fluid. The piston (3) is connected to the electric motor (5) of the module (1) by a recirculating ball screw (6), whose core (61) is fixedly connected to the piston (3) which itself is guided by needles (21) which are parallel to the axis (xx) of the piston (3) and with which notches (351) on the circumference of the piston (3) interact. The piston (3) is a piece, which is formed from a cylindrical body (32) made from anodized aluminum and an outer ring (35) made from steel, which is forcibly mounted on the edge (34) of the piston and is provided with notches (351) with a cross section which corresponds to the effective cross section of the needles (21).

6 Claims, 3 Drawing Sheets

(52) U.S. Cl.
 CPC .... *F15B 15/1471* (2013.01); *F05C 2201/021* (2013.01); *F05C 2201/0448* (2013.01)

(56) References Cited

U.S. PATENT DOCUMENTS

| | | | | |
|---|---|---|---|---|
| 2017/0137005 | A1* | 5/2017 | Weh | B60T 8/4031 |
| 2018/0345934 | A1* | 12/2018 | Weh | B60T 13/16 |
| 2019/0217837 | A1* | 7/2019 | Feigel | B60T 8/4081 |
| 2020/0062231 | A1* | 2/2020 | Micke | F16H 25/20 |

FOREIGN PATENT DOCUMENTS

| | | | | |
|---|---|---|---|---|
| DE | 102011112515 A1 | 2/2013 | | |
| DE | 102014212413 A1 | 12/2015 | | |
| JP | 2017104010 A | 6/2017 | | |
| WO | 2010006996 A1 | 1/2010 | | |
| WO | WO-2017089007 A1 * | 6/2017 | | F04B 9/02 |
| WO | WO-2020069872 A1 * | 4/2020 | | B60T 13/745 |

\* cited by examiner

INTEGRATED HYDRAULIC MODULE OF AN ELECTROHYDRAULIC SERVO BRAKE

CROSS-REFERENCE TO RELATED APPLICATIONS

The present application is the national stage of International Pat. App. No. PCT/EP2018/074680 filed Sep. 12, 2018, and claims priority under 35 U.S.C. § 119 to FR 1759769, filed in France on Oct. 18, 2017, the content of each of which are incorporated herein by reference in their entireties.

FIELD OF THE INVENTION

The present invention is directed to an integrated hydraulic module of an electrohydraulic servo brake that includes: a cylinder that accommodates a piston that delimits a chamber that receives the brake fluid for supplying a brake circuit depending on brake commands, where the piston is connected to the electric motor of the module by a recirculating ball screw that controls the translational movement of the piston by its rotational movement, a threaded core of the screw being fixedly connected to the piston, which itself is rotationally blocked but translationally free according to the axis, in that it is guided by needles that are parallel to the axis of the piston and with which recesses on the circumference of the piston interact, and a threaded sleeve of the recirculating ball screw being rotationally driven by the electric motor.

BACKGROUND

An integrated hydraulic modules of an electrohydraulic servo brake is known. It is formed from a piston made from anodized aluminum with an outer flange, that is provided with notches in order to overlap with the straight needles, that are fixed in the body of the cylinder.

The connection between the notches of the flange and the needles for rotational blocking is provided with a fine coat of grease to reduce the coefficient of friction.

The shape of the notches of the flange ensures the rotational blocking of the piston and thus the screw of the recirculating ball screw transmission, the rotational movement of the electric motor of the electric servo brake being transformed into a translational movement of the piston along its axis. The hydraulic fluid in the chamber is thus placed under pressure in order to transfer it to the brake circuit.

SUMMARY

However, the known approach has disadvantages. First and foremost, the piston is subject to deformations which threaten to produce surface fractures at the level of the anodization. This piston and its flange are not reliable against wear and the risk of loss of function. In addition, this system is not sufficiently robust with respect to surroundings parameters of the system, such as the dependency on the temperature or the radial forces in the system.

An object of the present invention is to provide an integrated hydraulic module of an electrohydraulic servo brake that offers greater reliability and robustness, in particular for the rotational blocking of the piston using simple and economic means.

For this purpose, the present invention has a hydraulic module of an electrohydraulic servo brake of the previously defined type, characterized in that the piston is a piece formed from a cylindrical body made from anodized aluminum and an outer ring made from steel, which is mounted by force on the edge of the piston and has notches with a cross section that corresponds to the effective cross section of the needles, and is provided in a corresponding position about the axis xx in order to interact with the needles and to translationally guide the piston and to block it rotationally, in order to rotationally block the core of the recirculating ball screw in that it translationally remains free along the axis. This module has an advantage that it has a simple and reliable design for guiding the piston and blocking it rotationally without increasing the space requirement.

In an example embodiment, the open edge of the piston includes cutouts, and the ring, in the form of a circular collar, has a grooved inner surface and an outer surface that is provided with as many notches as there are guide needles, the notches being located about the axis in a position that corresponds to the needles, and, in the radial direction of the notches, the ring includes radial tabs facing the inner side, these tabs having a circumferential length that corresponds to the circumferential length of the cutouts of the piston and having positions corresponding to those of the cutouts, so that the tabs are fixed into the cutouts due to a tight assembly and the grooves of the inner surface of the ring hook into the circumferential surface of the edge of the piston.

This assembly mode of the body of the piston and of the collar is a form-locked assembly that is stable and does not weaken the composite piston thus obtained. This assembly is fast and easy to carry out both for the shaping of the two components and also for their union.

In an example embodiment, the open edge of the piston includes cutouts and the ring, in the form of a circular collar, has a grooved inner surface and an outer surface that is provided with as many notches as there are guide needles, the notches being located about the axis in a position that corresponds to the needles, and, in the radial direction of the notches, the ring including radial tabs facing the inner side, these tabs having a circumferential length that corresponds to the circumferential length of the cutouts of the piston and having positions corresponding to those of the cutouts, so that the tabs are fixed into the cutouts due to a tight assembly and the grooves of the inner surface of the ring hook into the circumferential surface of the edge of the piston.

In an example embodiment, the cutouts of the open edge of the piston have a rectangular shape and the radial tabs have a rectangular cross section, with a radial width that is the same as the radial width of the cutouts. This simple radial assembly is carried out in a precise and fast way. In an example embodiment, the outer surface of the ring includes an auxiliary notch in order to facilitate the through passage of air on both sides of the ring when the piston is moving in the cylinder. This notch prevents air from being sealed by the piston on the front side or the back side of the ring, and decelerates the movement of the piston. An interruption of the function of the braking system is thus prevented.

In an example embodiment, the cylinder has three guide needles distributed at equal angles. This tripartite symmetry forms the minimal and most balanced guide means for this function.

In an example embodiment, the needles have a cylindrical shape with a circular cross section, and the notches have a circular arc cross section that corresponds to the cross section of the needles. In this example embodiment, the notches surround the needles to approximately half of the circumferential cross section of the needles.

The present invention is described below in greater detail with referent to the appended drawings, which show an example embodiment of an integrated hydraulic module of an electrohydraulic servo brake.

DETAILED DESCRIPTION

Figure 1:
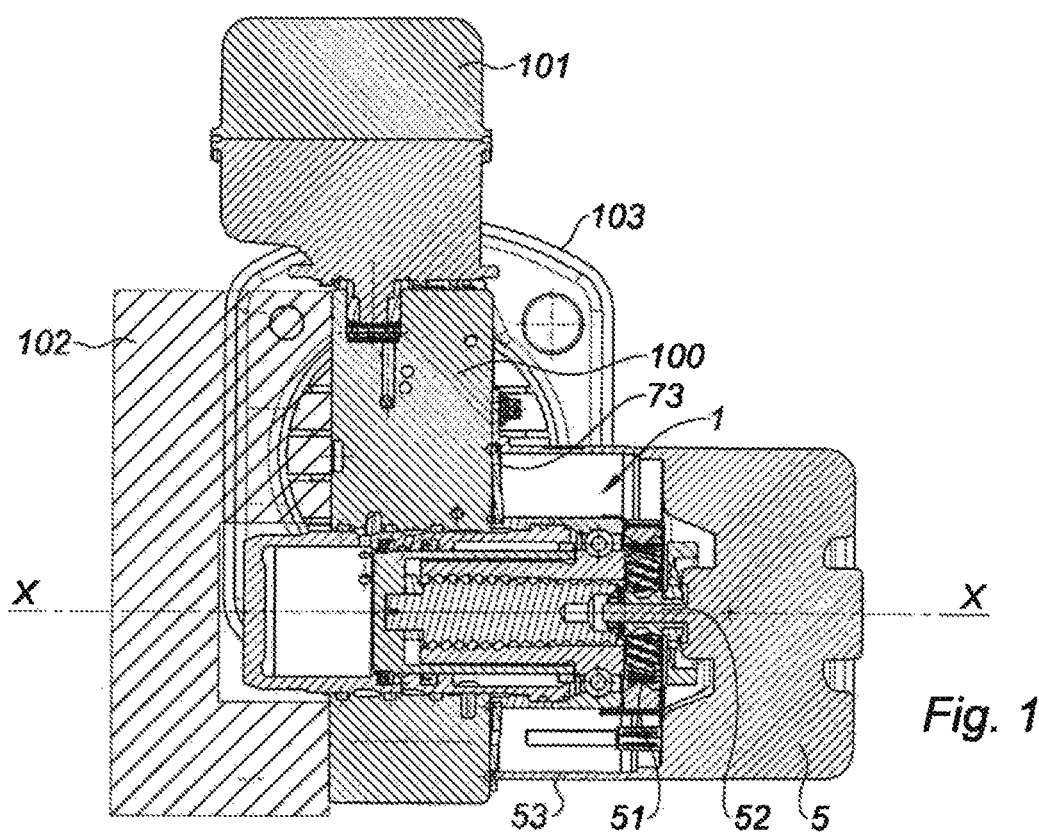
FIG. 1 shows a cross section of a hydraulic block equipped with a hydraulic module, which itself is sectioned in the axial direction, according to an example embodiment of the present invention.

Referring to the cross-sectional view of FIG. 1, an example embodiment of the present invention is directed to a hydraulic module 1 for a hydraulic block 100 that is superimposed by a brake fluid reservoir 101 that supplies the hydraulic block 100. A control unit 102 of the module is fixed on the side of hydraulic block 100.

Hydraulic block 100 is traversed by hydraulic module 1, which is fixed on an outer side of block 1, covered by its electric motor 5 (its cover), which itself is separately fixed on this side of hydraulic block 100.

Hydraulic block 100 thus formed is fixed on the splash-back of the vehicle by a support plate 103, which is supported by the back side of hydraulic block 100 according to the installation orientation of the block in the vehicle.

Lines traverse hydraulic block 100 for the exchange of brake fluid between reservoir 101 and hydraulic block 100, and between the latter and the brake circuit according to the control signals applied to control unit 102 by the brake pedal and/or the brake control system (ABS, EPS).

Figure 2:
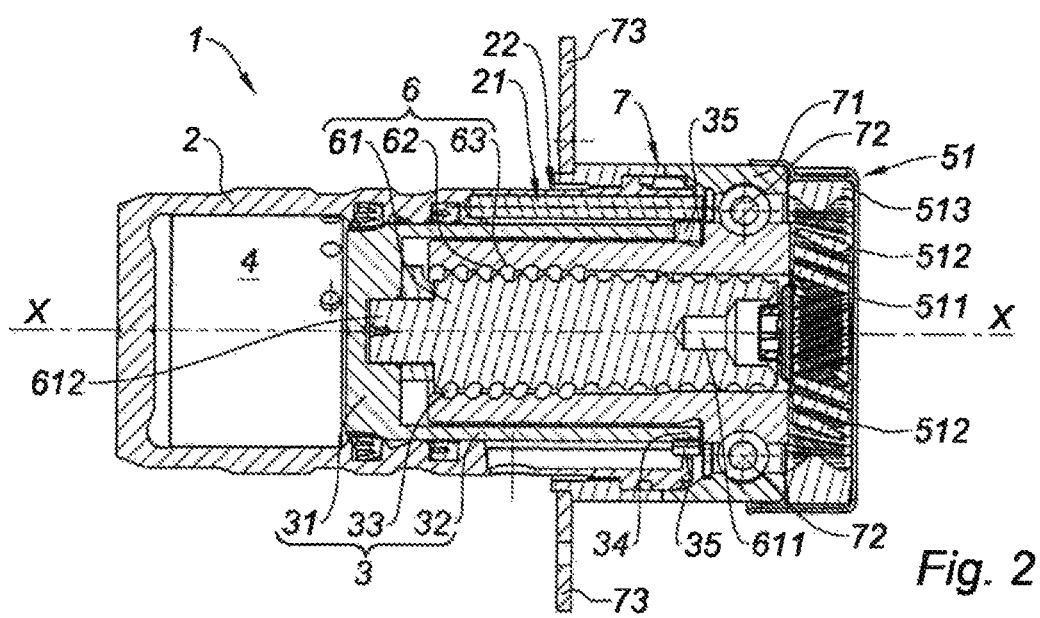
FIG. 2 shows an axial section of only the hydraulic module, according to an example embodiment of the present invention.

The sectional view of hydraulic module 1 without its electric motor in FIG. 2 facilitates a better understanding of the structure and function.

Hydraulic module 1 is made up of a fixed cylinder 2, which, with a piston 3, delimits a brake fluid chamber 4 for supplying the brake circuit via piston 3. Piston 3 is connected to electric motor 5 of the servo brake, which receives the electrical signals from control unit 102. The electric motor is connected to piston 3 and a recirculating ball screw 6, which transforms the rotational movement of motor 5 into a translational movement of piston 3.

Recirculating ball screw 6 is made, on the one hand, of a threaded core 61 which is fixedly connected rotationally and translationally to piston 3 according to axis xx, the piston being itself rotationally blocked, and, on the other hand, of a threaded sleeve 62 that surrounds core 61 and receives the movement of electric motor 5 by a planetary gear 51. Threaded core 61 is embedded via a form-locked connection into the thickness of bottom 31 of piston 3 by its extension 612. Sleeve 62 engages with threaded core 61 via balls 63, which circulate in a loop so that the rotation of sleeve 62, which is translationally fixed according to axis xx, generates the translation of threaded core 61 and of piston 3, which in turn are rotationally fixed.

Planetary gear 51 is made up of a central sprocket 511, which is supported by axle 52 of motor 5 and engages with planetary wheels 512, whose axes are fixedly connected to threaded sleeve 62 in order to drive the same. Planetary gear 51 is covered by a cover 513 that is fixed on housing 7 of module 1, which is traversed by axle 52 of motor 5.

Housing 7 is provided with a fixing collar 73 in order to be mounted on the side of hydraulic block 1.

Since axle 52, fixed on central sprocket 511, projects from the surface of planetary gear 51, threaded core 61 has a cavity 611 on its opposite-lying surface, which facilitates the free accommodation of this protruding section (without contact with the same) when core 61 is located at its most strongly retracted position, which is depicted in FIGS. 1 and 2.

Sleeve 62 is rotationally mounted in fixed collar 71 of housing 7 by a ball bearing 72.

Figure 3:
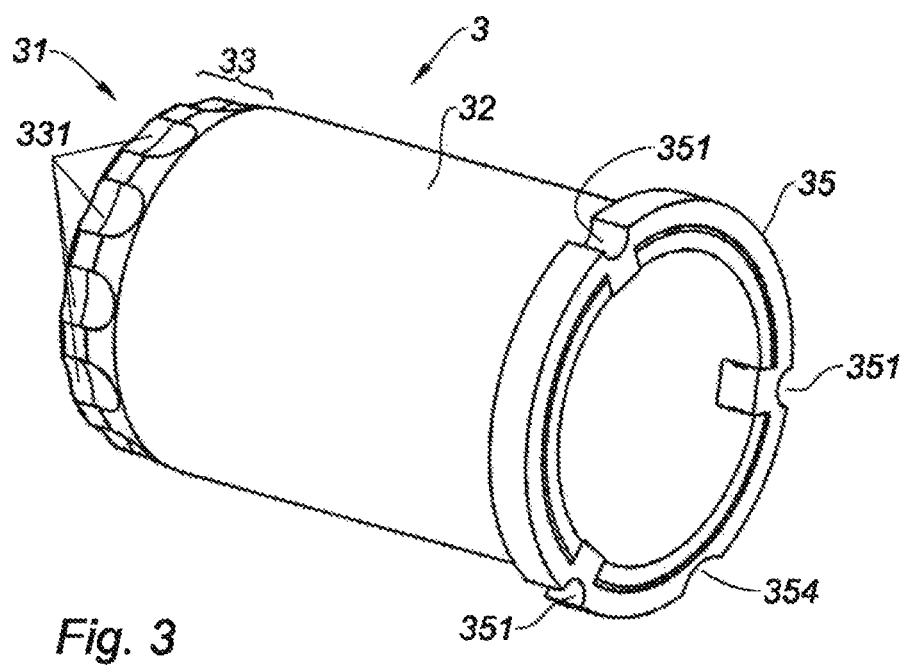
FIG. 3 shows an isometric view of the piston of the hydraulic module, according to an example embodiment of the present invention.
Figure 4B:
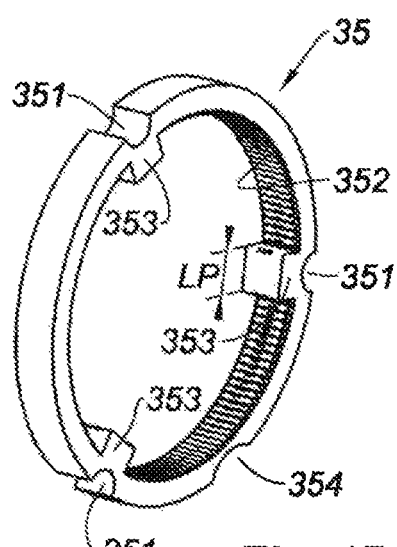
FIG. 4B shows an isometric view of a ring that is to be mounted on the body of the piston from FIG. 4A by a tight assembly, according to an example embodiment of the present invention.
Figure 4A:
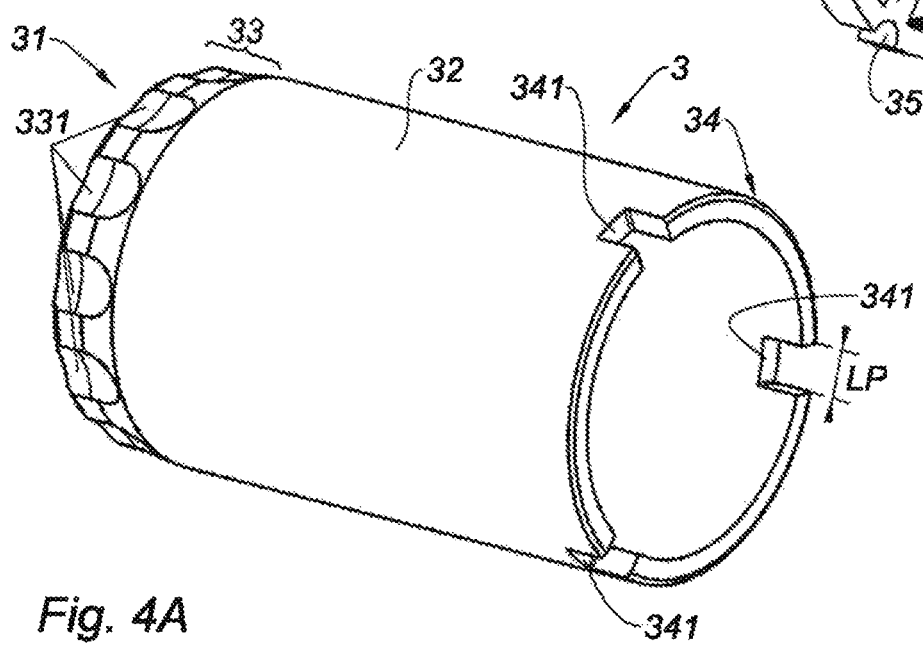
FIG. 4A shows an isometric view of a body of the composite piston and the notches, according to an example embodiment of the present invention.

According to FIGS. 3, 4A, and 4B, piston 3, which slides in hydraulic cylinder 2, is provided on edge 34 of its sheath 32 with an outer ring 35, which interacts with guide needles 21 (FIG. 2). These needles 21 are straight, in parallel to axis xx of cylinder 2 and they are each held in the body of cylinder 2 at the end of a longitudinal cavity 22, which is parallel to axis xx.

In order to not complicate the drawing, FIG. 1 does not show the needle, which would otherwise be sectionally shown. This needle 21 is only depicted in FIG. 2.

Ring 35 is provided with notches 351 having an arc shaped cross section whose shape is complementary to that of the projecting section of needles 21, which themselves are cylindrical with a circular cross section, in order to guide translationally along the needles. Notches 351 are located in angle positions that correspond to those of needles 21 about axis xx of cylinder 2.

FIG. 2 shows ring 35 in a sectional view engaged with needle 21, and lets the connection by the engagement of the cutaway shapes of notches 351 of sheath 32 and of tabs 353 of ring 35 be apparent. Since the sectional level is axial, other needles 21 and notches 351 of ring 35 do not appear.

Sheath 32 of piston 3 interacts closely with seals 23 (sleeves) of cylinder 2. These circumferential seals 23 lie on both sides of the openings of connecting lines between cylinder 2 and brake fluid reservoir 101. These openings are not depicted in detail, since their function is known.

FIG. 3 is a side view of piston 3, which is formed by cylindrical body 32 (sheath); its closed bottom 31, which faces the side of chamber 4 of cylinder 2 and which connects to its circumferential surface by a circumferential zone 33 that is provided with recesses 331 that damp the interruption of the fluid flow during the passage of piston 3 at the circumferential openings of the cylinder, which are connected to the brake fluid reservoir, in order to prevent sudden effects of pressure surges.

Open end 34 of piston 3 is surrounded by ring 35, which ensures the rotational blocking of the piston. Ring 35 has circumferential notches 351 in a number equal to that of needles 21, in order to overlap with the same and thus to block the rotation of piston 3 and core 61 about axis xx.

Needles 21 are, for example, present as three in number, which are distributed at equal angles about axis xx.

FIGS. 4A and 4B show the body of piston 3 and its ring 35, which are separated prior to their assembly. Open edge 34 of piston 3 has rectangular cutouts 341 with a circumferential width LP. Ring 35 has a grooved, circular inner surface 352 with radially projecting tabs 353 with a circumferential cross section (circumferential width) equal to that LP of cutouts 341 of edge 34 of the piston and in coincident positions. These radial tabs 353 are consequently distributed at equal angles. The smooth outer edge of ring 35 has its notches 351 at the level of tabs 353, so that this zone of the ring is not weakened by a reduction of the thickness at the level of notches 351.

Ring 35 also has an auxiliary notch 354 between two guide notches. This auxiliary notch 354 is used both for orienting this piece during assembly and to prevent the compression of air on both sides of ring 35, when piston 3 is quickly displaced in cylinder 2. The axial depth of cutouts 341 is essentially equal to the thickness of tabs 353 of collar 35.

The inner diameter of ring 35 is slightly smaller than the outer diameter of piston 3, so that the assembly of ring 35 and of sheath 32 of the piston takes place by force according to the axis. The teeth of grooves 352 engage with the outer surface of edge 34 of sheath 32 and additionally place three cutouts 341 under compression in order to thus compress tabs 353.

According to the present invention, piston 3 is made from anodized aluminum and the ring is made from steel.

The assembly of piston 3 is mechanically resistant to the intense and optionally alternating forces that are exerted on the screw and are transmitted to the ring/needle boundary surface.

Figure 5A:
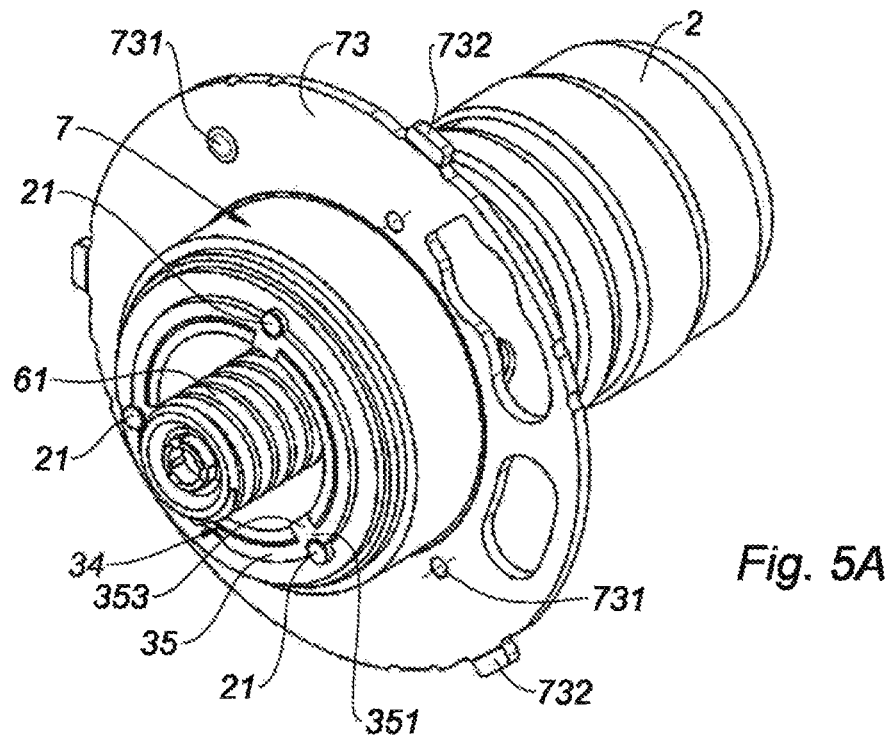
FIG. 5A shows an isometric view of the hydraulic module without planetary gear, according to an example embodiment of the present invention.
Figure 5B:
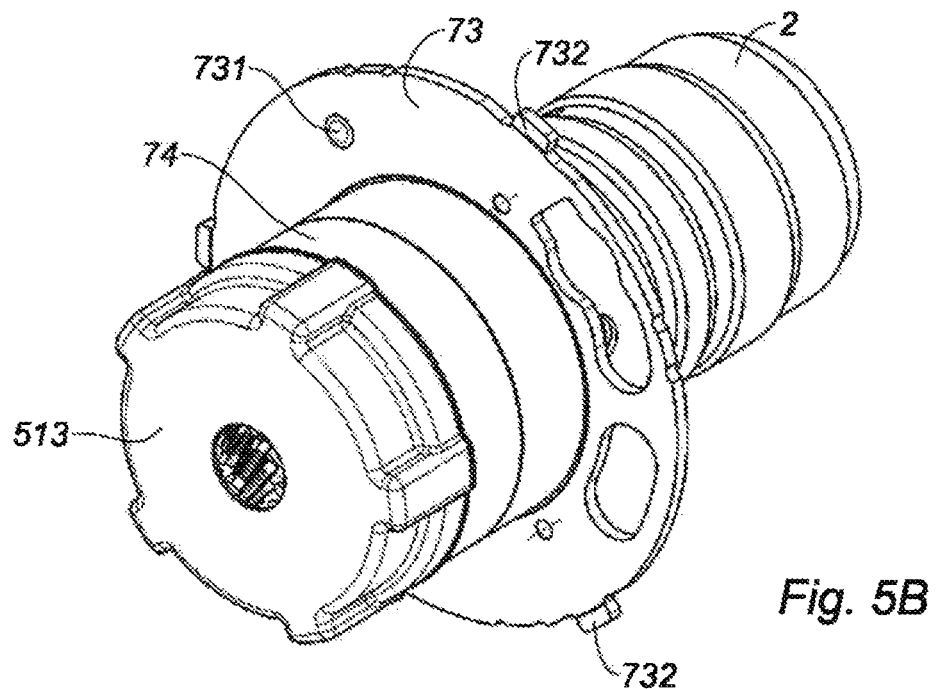
FIG. 5B is an isometric view of the hydraulic module with the planetary gear and its cover, according to an example embodiment of the present invention.

FIGS. 5A and 5B show hydraulic module 1 partially assembled (FIG. 5A) and completely assembled (FIG. 5B) in order to be mounted in hydraulic block 100. According to FIG. 5A, cylinder 2 is mounted at housing 7 with a fastening collar 73, but without transmission 51 and its cover 513. Cylinder 2 appears around threaded core 61, which shows the ends of needles 21 and outer ring 35 with its notches 351, which overlap needles 21 and edge 34 of sheath 32 of the piston.

Sleeve 62 is not depicted, but the projecting end of core 61 appears.

Fastening collar 73 includes boreholes 731 for the screws and the circumference has blocking tabs 732, in order to interact with cover 63 of motor 5 during the fixing on block 100 (FIG. 1).

FIG. 5B shows hydraulic module 1 assembled, but without its electric motor 5. Sleeve 62 is located at this point in extension 74 of housing 7, and sleeve 62 and the balls of the screw are located at the same point as transmission 51 and cover 513.

LIST OF REFERENCE NUMERALS

1 Hydraulic module
2 Cylinder
21 Guide needle
22 Cavity
3 Piston
31 Bottom
32 Sheath/cylindrical body
33 Circumferential zone
331 Recess
34 Open edge
341 Cutout
35 Outer ring
351 Notch
352 Grooved inner surface
353 Tab
354 Complementary notch
4 Chamber
5 Electric motor
51 Transmission
511 Central sprocket
512 Planetary wheel
513 Cover
52 Axle
53 Cover
6 Recirculating ball screw
61 Threaded core
611 Cavity
612 Extension
62 Threaded sleeve
63 Balls
7 Housing
71 Fixed collar
72 Ball bearing
73 Fixing collar
731 Borehole
732 Tab
74 Extension
100 Hydraulic block
101 Hydraulic fluid reservoir
102 Control unit
103 Support plate
LP Circumferential width
xx Axis of the cylinder

What is claimed is:

1. An integrated hydraulic module of an electrohydraulic servo brake, the hydraulic module comprising:
    an electric motor;
    a cylinder including a chamber, wherein the chamber is arranged for receiving brake fluid to supply to a brake circuit depending on brake commands;
    a piston that:
        is accommodated by the cylinder;
        delimits the chamber;
        is rotationally fixed;
        is translationally movable along an axis of the piston in that the piston is guided by needles that are parallel to the axis of the piston and that are arranged in recesses on a circumference of the piston; and
        includes an anodized aluminum cylindrical body;
    a steel ring mounted onto an edge of the piston and including notches, a cross-section of each of which corresponds to an effective cross section of the needles and that are arranged in circumferential positions around the axis that correspond to circumferential positions of the needles, so that respective ones of the needles are at least partially arranged within corresponding respective ones of the notches; and
    a recirculating ball screw that:
        connects the piston to the electric motor;
        is configured to control a translational movement of the piston;
        includes a threaded core that is fixedly connected to the piston, is rotationally fixed by the piston, and is translationally movable along the axis; and
        includes a threaded sleeve that is configured to be rotationally driven by the electric motor.

2. The hydraulic module of claim 1, wherein:
a side of the piston that is at the edge of the piston on which the ring is mounted is open;
the edge includes cutouts;
the ring is formed as a circular collar that includes:
   a grooved inner surface, grooves of which hook into an outer circumferential surface of the edge of the piston;
   an outer surface in which a plurality of notches are formed; and
   radial tabs (a) that protrude radially inwardly at circumferential positions that are also circumferential positions of both the notches and the cutouts, (b) whose respective lengths in a circumferential direction correspond to respective lengths of the cutouts in the circumferential direction, and (c) that each is fastened tightly into a respective one of the cutouts; and
grooves of the inner surface of the ring hook into the circumferential surface of the edge of the piston.

3. The hydraulic module of claim 2, wherein the outer surface of the ring includes an auxiliary notch that facilitates passage of air between sides of the ring when the piston is moved in the cylinder.

4. The hydraulic module of claim 2, wherein the cutouts and radial tabs are rectangular of equal widths.

5. The hydraulic module of claim 1, wherein the needles consist of three needles distributed equiangularly around the axis of the piston.

6. The hydraulic module of claim 1, wherein the needles are cylindrical with a circular cross section, and the notches have a circular arc cross section that corresponds to the cross section of the needles.

* * * * *